(12) United States Patent
Wardojo et al.

(10) Patent No.: US 12,399,335 B1
(45) Date of Patent: Aug. 26, 2025

(54) MOUNTING MECHANISM FOR NETWORKING DEVICE

(71) Applicant: FRONTIER COMMUNICATIONS HOLDINGS, LLC, Dallas, TX (US)

(72) Inventors: Erwin Wardojo, McKinney, TX (US); Bryan Pauling, Rochester, NY (US); John Valdez, Copper Canyon, TX (US); Ray Sharrow, Lakeland, FL (US)

(73) Assignee: FRONTIER COMMUNICATIONS HOLDINGS, LLC, Dallas, TX (US)

( * ) Notice: Subject to any disclaimer, the term of this patent is extended or adjusted under 35 U.S.C. 154(b) by 0 days.

(21) Appl. No.: 18/960,545

(22) Filed: Nov. 26, 2024

Related U.S. Application Data (60) Provisional application No. 63/714,422, filed on Oct. 31, 2024.

(51) Int. Cl.
*G02B 6/44* (2006.01)

(52) U.S. Cl.
CPC ....... *G02B 6/4446* (2013.01); *G02B 6/44526* (2023.05)

(58) Field of Classification Search
CPC .......................... G02B 6/4446; G02B 6/44526
See application file for complete search history.

(56) References Cited

U.S. PATENT DOCUMENTS

| | | | | |
|---|---|---|---|---|
| 5,069,516 A | * | 12/1991 | Kohy | G02B 6/501 174/38 |
| 2010/0278500 A1 | * | 11/2010 | Campos | G02B 6/4439 385/135 |

\* cited by examiner

*Primary Examiner* — Sung H Pak
(74) *Attorney, Agent, or Firm* — MARSHALL, GERSTEIN & BORUN LLP (57) ABSTRACT

A retention bracket for retaining an optical network component is provided that includes a base panel having a body defining cavity, and a mounting panel adapted to be at least partially inserted into the cavity of the base panel. The mounting panel includes a body having an upper portion, a lower portion, and a facing surface. The facing surface has at least one component coupling member extending therefrom that couples with the optical network component. The base panel and the mounting panel cooperate to receive and retain the at least one networking component.

14 Claims, 11 Drawing Sheets

MOUNTING MECHANISM FOR NETWORKING DEVICE

CROSS-REFERENCE TO RELATED APPLICATIONS

This application claims priority to and the benefit of the filing date of U.S. Provisional Patent Application No. 63/714,422, filed on Oct. 31, 2024 and entitled "MOUNTING MECHANISM FOR NETWORKING DEVICE", the entire disclosure of which is hereby expressly incorporated by reference herein.

FIELD OF THE DISCLOSURE

This disclosure relates generally to networking systems, and, more particularly, to mounting mechanisms for networking systems.

BACKGROUND

A conventional passive optical network (PON) includes one or more optical line terminals (OLTs) at a central location connecting to one or more optical last mile termination units (LMTUs) disposed at respective customer premises (e.g., physical locations serviced by the PON) via one or more optical fibers. A PON is typically implemented using a point-to-multipoint topology in which a feeder optical fiber from an OLT serves multiple last mile termination units. In some examples, an LMTU may be in the form of an optical network terminal (ONT) or an optical network unit (ONU) that is optically connected to the OLT via a respective distribution optical fiber received at the LMTU. Such ONTs are typically disposed within enclosures that may be affixed to a structure, a pole, and/or other suitable stationary objects.

Because of continued advancements to PON technologies, improved and/or higher-powered ONTs have been developed which may be of different dimensions than existing units. Such ONTs may require replacement retention mechanisms (e.g., brackets, straps, etc.) in order to securely retain the ONT within the enclosure. Such mechanisms may require on-site modifications and/or alterations to the existing enclosure (e.g., by removing portions of the enclosure or other retention features), and ultimately may not provide for securely retaining the ONT. Further, such modifications may be time-consuming and may lead to improper installations. Further still, such modifications to the existing enclosure may result in the enclosure no longer being capable of securely retaining other ONT models due to the removal of necessary retention features and/or material.

Accordingly, there is a need for improved devices having improved functionalities.

SUMMARY

In accordance with a first aspect, a retention bracket for retaining an optical network component is provided that includes a base panel having a body defining cavity, and a mounting panel adapted to be at least partially inserted into the cavity of the base panel. The mounting panel includes a body having an upper portion, a lower portion, and a facing surface. The facing surface has at least one component coupling member extending therefrom that couples with the optical network component. The base panel and the mounting panel cooperate to receive and retain the at least one networking component.

In some examples, the at least one component coupling member includes a keyhole protrusion adapted to engage a corresponding keyhole opening formed on the optical network component. Further, in some approaches, the mounting panel is adapted to be slidably inserted into the cavity from a cavity opening formed on a side portion of the base panel.

In some arrangements, at least one of the upper portion or the lower portion of the mounting panel includes a sawtooth profile adapted to be received by a corresponding sawtooth opening formed in the cavity of the base panel. Further, the sawtooth profile may be in the form of a crenellated sawtooth profile.

In some implementations, at least one of the upper portion or the lower portion of the mounting panel further includes a chamfered surface adapted to slidably engage with the body of the base panel. The body of the base panel may further include a chamfered surface adapted to slidably engage the chamfered surface of the mounting panel.

In these and other forms, the base panel may include a stop member that engages the mounting panel to limit lateral movement thereof. Further, in some arrangements, the body of the mounting panel includes at least one through hole that receives a fastener to couple the mounting panel with a structure.

In accordance with a second aspect, an enclosure for receiving at least one networking component may include a shell defining an interior volume and a retention bracket adapted to be received within the interior volume of the shell. The retention bracket includes a base panel having a body defining a cavity and a mounting panel adapted to be at least partially inserted into the cavity of the base panel. Further, the mounting panel includes a body having an upper portion, a lower portion, and a facing surface having at least one component coupling member extending therefrom adapted to couple with the optical network component. The base panel, and the mounting panel cooperate to receive and retain the at least one networking component within the shell.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention, and explain various principles and advantages of those examples.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples. Also, common but well-understood elements that are useful or necessary in a commercially feasible examples are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

Disclosed examples of the disclosure provide a number of advantages over existing techniques for securing and retaining components of passive optical networks (PONs). Generally speaking, a component of a PON, as utilized herein, may be in the form of a last mile termination unit (e.g., an optical network terminal (ONT) or an optical network unit (ONU) disposed at customer premises). Such a component may be securely retained within an existing enclosure using a bracket or locking apparatus. More specifically, the brackets described herein may accommodate dimensionally larger networking components without the need for modifications to the enclosure and/or the networking component to achieve a secure fit. Further, in some examples, the brackets described herein may eliminate the need for additional securing mechanisms. Last, in some examples, the brackets described herein may be adjustable in nature to securely accommodate and retain various networking components having different sizes and/or shapes.

The retention mechanisms described herein incorporate a universal base panel that is coupled with an enclosure or other fixture. This base panel may receive and/or otherwise couple with any number of unique mounting panels having specific orientations and features to assist with coupling to desired networking components. The apparatuses described herein may advantageously be installed within an enclosure having limited space due to the novel arrangement of the engagement mechanisms between the base panel and the mounting panel.

Figure 1:
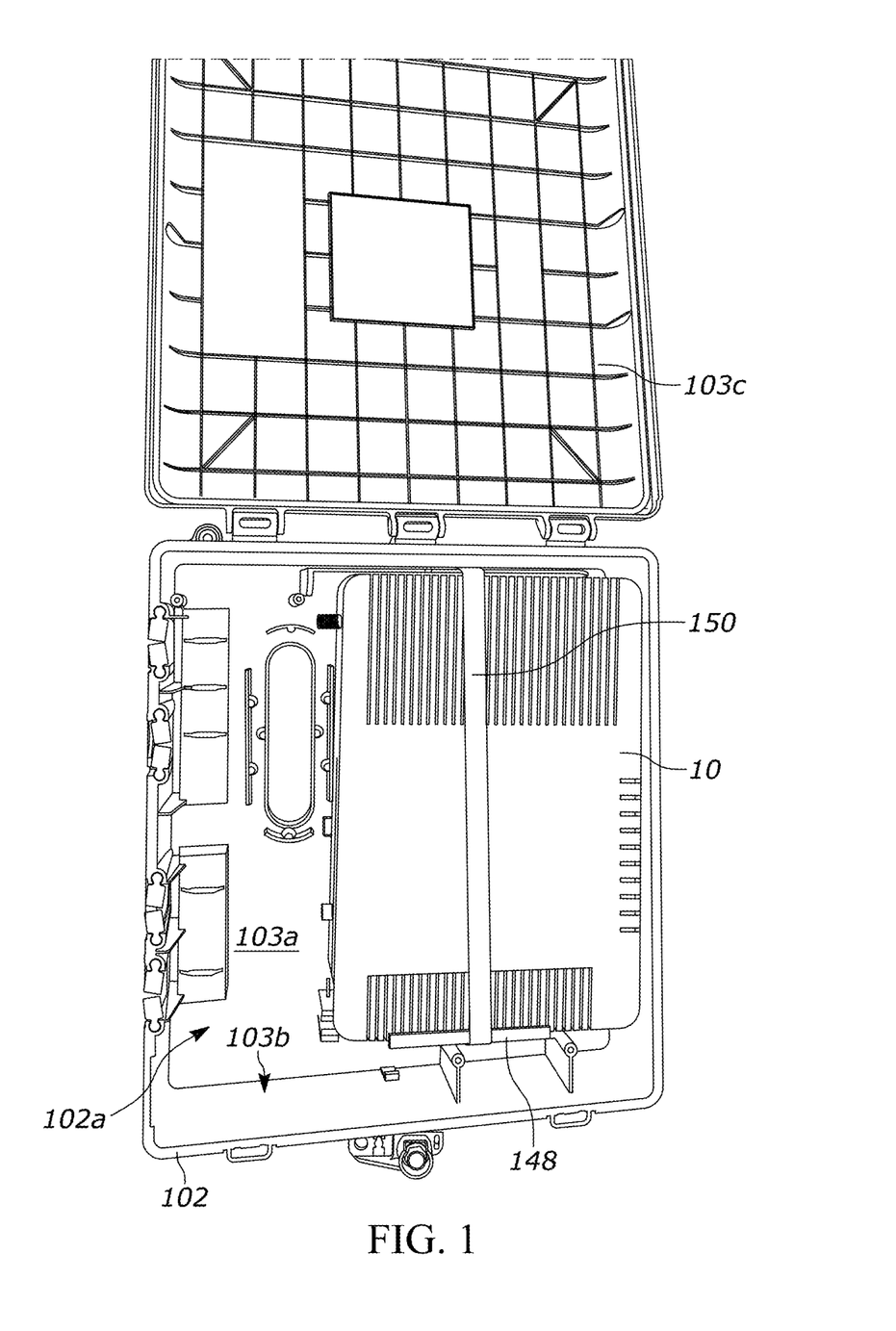
FIG. 1 is a perspective view of an example enclosure for retaining at least one networking component in which the systems, methods, and/or techniques of the present disclosure may be implemented.
Figure 2:
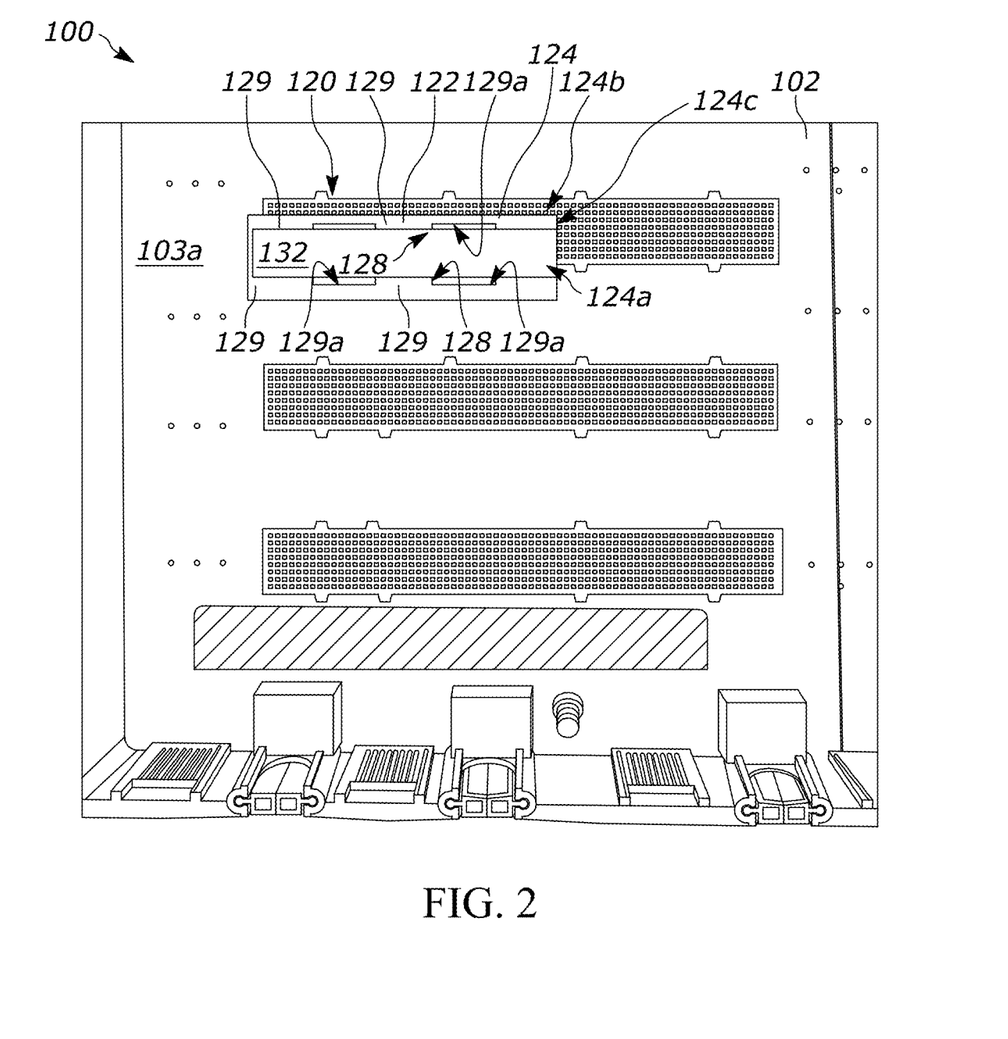
FIG. 2 is a perspective view of a portion of the example enclosure of FIG. 1 in a partially-assembled configuration in accordance with various examples.

Turning now to the Figures, an enclosure 100 is provided for retaining at least one networking component 10 (e.g., an ONT, ONU, and/or any other device). The enclosure 100 may include a shell 102 defining an interior volume 102*a* and a retention bracket 120. More specifically, the illustrated shell 102 of the enclosure 100 includes a rear panel 103*a*, a number of sidewalls 103*b*, and a door 103*c*. While the illustrated enclosure 100 is in the form of a generally rectangular box, it is to be appreciated that the enclosure 100 may take any number of suitable shapes, forms, and/or configurations.

The retention bracket 120 may be at least partially disposed within, coupled with, and/or otherwise positionable within the interior volume 102*a* of the shell 102. The retention bracket 120 includes a base panel 122 and a mounting panel 142 adapted to operably (e.g., slidably) couple with each other. The various components of the retention bracket 120 may be constructed from any number of suitable materials such as, for example, polymeric materials, metals, and the like. Other examples are possible.

Generally speaking, the base panel 122 is adapted to be removably or permanently affixed to or otherwise formed with the shell 102. With reference to FIGS. 3-9, the base panel 122 includes a body 124 defining a cavity 124*a*. Positioned on a side portion 124*b* of the cavity 124*a* is a cavity opening 124*c*. In other words, in the illustrated examples, the cavity 124*a* is in the form of a depression or recess formed in the body 124 that extends to an edge thereof.

Figure 3:
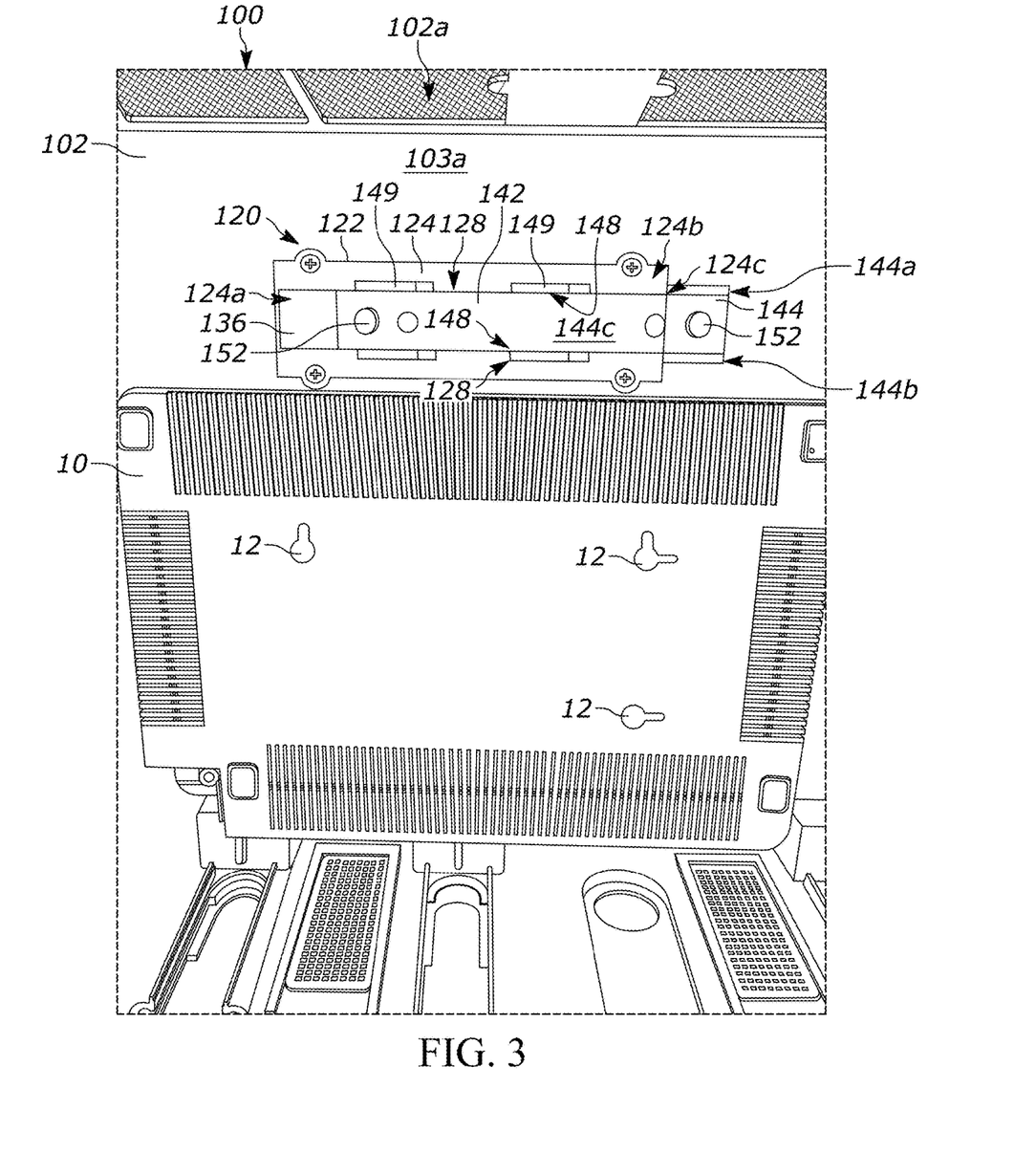
FIG. 3 is a perspective view of a portion of the example enclosure of FIGS. 1 & 2 in accordance with various examples.
Figures 4, 5:
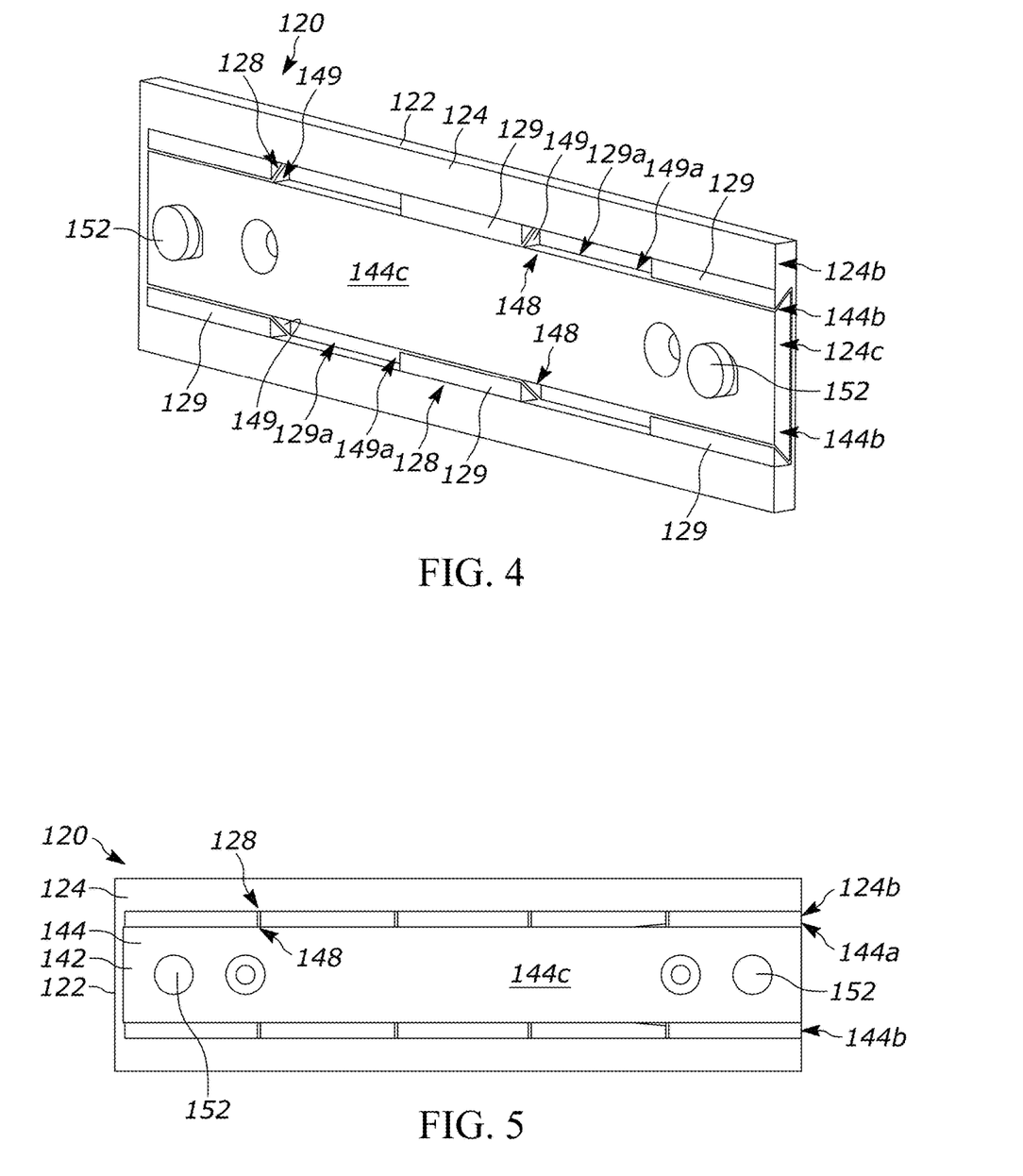
FIG. 4 is a perspective view of an example retention bracket having an example base panel and a first example mounting panel for use with the example enclosure of FIGS. 1-3 in accordance with various examples.
FIG. 5 is a front elevation view of the example retention racket of FIG. 4 in accordance with various examples.
Figure 6:
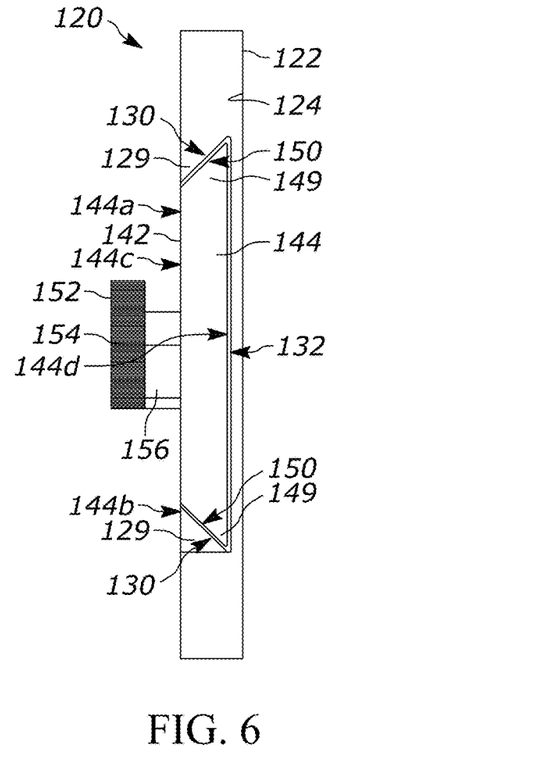
FIG. 6 is a right side elevation view of the example retention racket of FIGS. 4 & 5 in accordance with various examples.

In some examples, the base panel 122 may be secured with the shell via fasteners, latching engagements, and the like. As a non-limiting example, as can be seen in FIG. 3, the base panel 122 may include any number of through holes 126 that may receive a fastener to secure with the shell 102. It is to be appreciated that in some forms, the base panel 122 may be coupled with the shell 102 via adhesives, fusion welding, and the like, and in yet other examples, the base panel 122 may be integrally formed with the shell 102. In other examples (not illustrated) a portion of the shell 102 may include a recessed portion that is dimensioned to receive at least a portion of the base panel 122 therein. In some examples, the recessed portion may frictionally engage the base panel 122, while in other examples, the coupling may be aided by the use of fasteners or other suitable coupling approaches.

Figure 7:
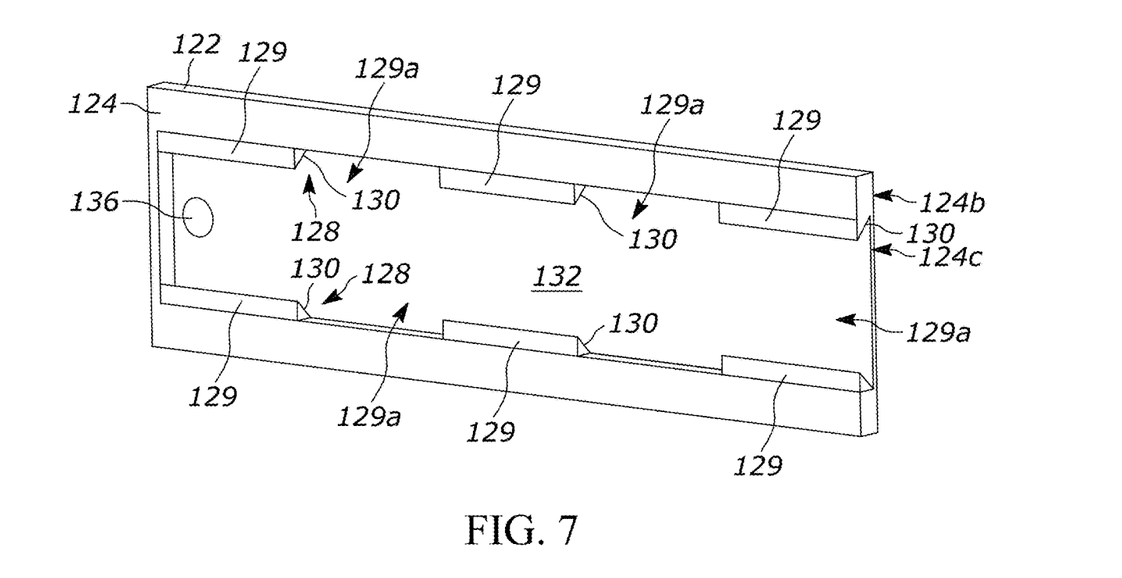
FIG. 7 is a perspective view of the example base panel of the example retention bracket of FIGS. 4-6 in accordance with various examples.
Figure 8:
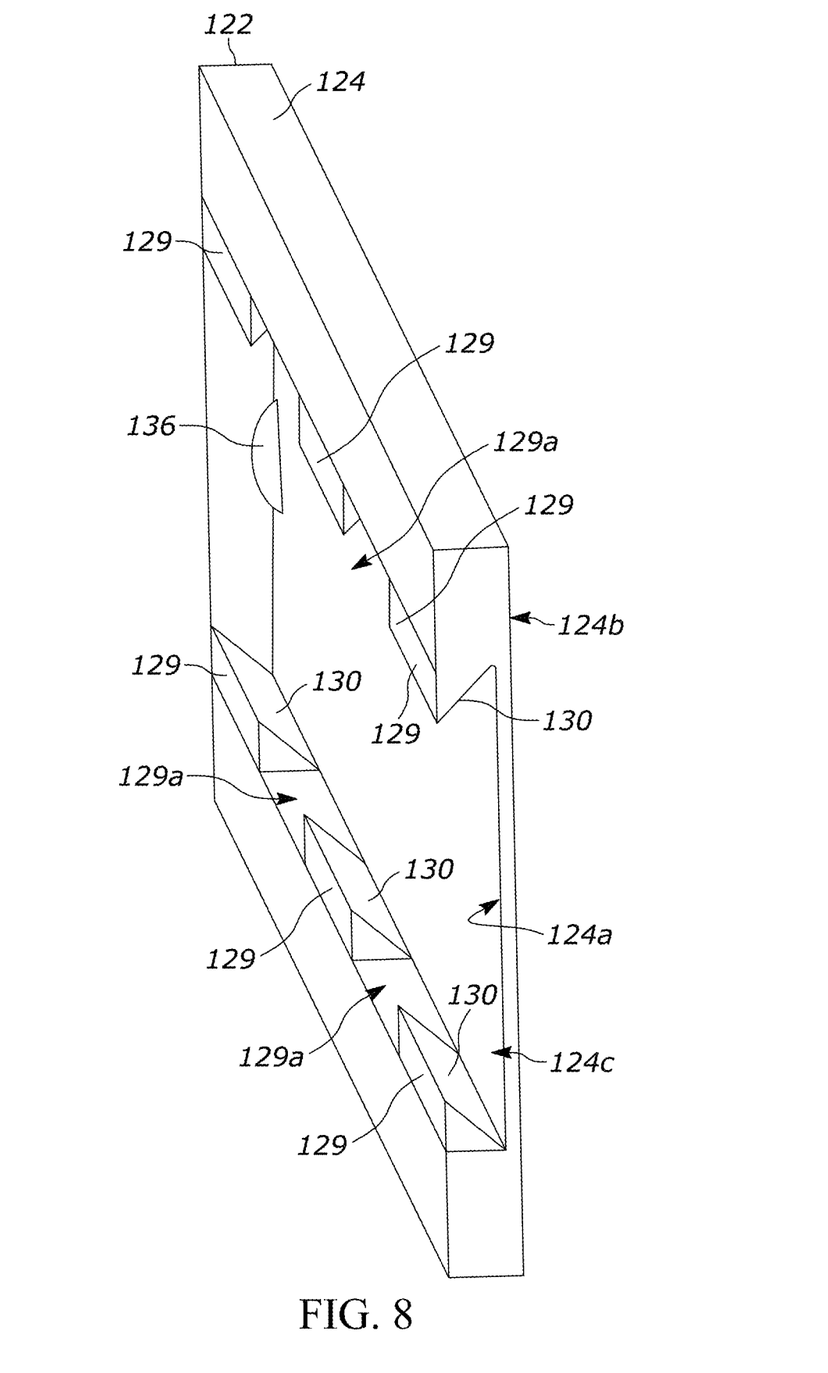
FIG. 8 is a right side perspective view of the example base panel of FIGS. 4-7 in accordance with various examples.
Figure 9:
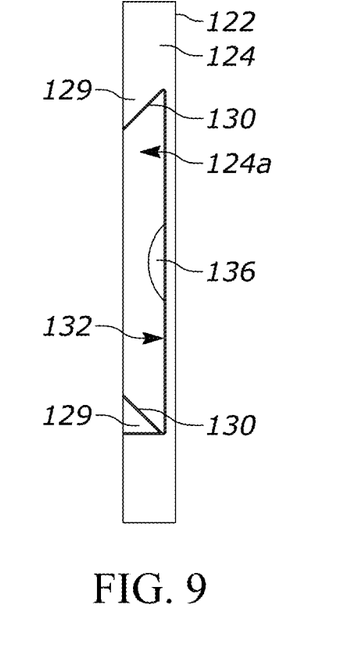
FIG. 9 is a right side elevation view of the example base panel of FIGS. 4-8 in accordance with various examples.

With particular reference to FIGS. 7-9, the body 124 of the retention panel 122 includes a sawtooth profile 128 whereby a number of abutments 129 extend inwardly into the cavity 124a. Each adjacent abutment 129 is separated by a corresponding gap 129a. In the illustrated examples, the abutments 129 are in the form of a crenellated sawtooth profile whereby a number of rectangular protrusions and gaps are formed. It is to be appreciated that any number of suitable shapes or configurations for the sawtooth profile 128 may be used whereby any number of desired abutments 129 and corresponding openings or gaps 129a are formed.

In some arrangements, any number of the abutments 129 may include an inner chamfered surface 130. This chamfered surface 130 may be angled relative to the outer surface of the abutment 129. In some arrangements, an angle of approximately 45° may be formed between the angled surface 130 and a rear wall 132 of the base panel 122.

The base panel 122 further includes a stop member 136. In some examples, the stop member 136 may be formed on the rear wall 132 of the base panel 122 and may be in the form of a bump, nodule, or similar protrusion. Other examples are possible.

With reference to FIGS. 4-6 & 10, the first example mounting panel 142 is provided. The mounting panel 142 includes a body 144 having an upper portion 144a, a lower portion 144b, a device facing surface 144c, and a base panel facing surface 144d. The device facing surface 144c includes any number of component coupling members 152. In the illustrated example, each component coupling member 152 is in the form of a keyhole protrusion 154 that extends from a finger 156 projecting from the device facing surface 144c. The keyhole protrusion 154 may be of any suitable size and/or configuration to operably couple with a corresponding keyhole opening 12 disposed on the networking component 10 (see, e.g., FIG. 3). The keyhole protrusion 154 may be inserted into the corresponding keyhole opening 12 of the networking component 10 to secure the networking component 10 with the mounting panel 142. As a result, the networking component 10 may rest against the device facing surface 144c while being additionally supported by the component coupling member 152.

Figure 10:
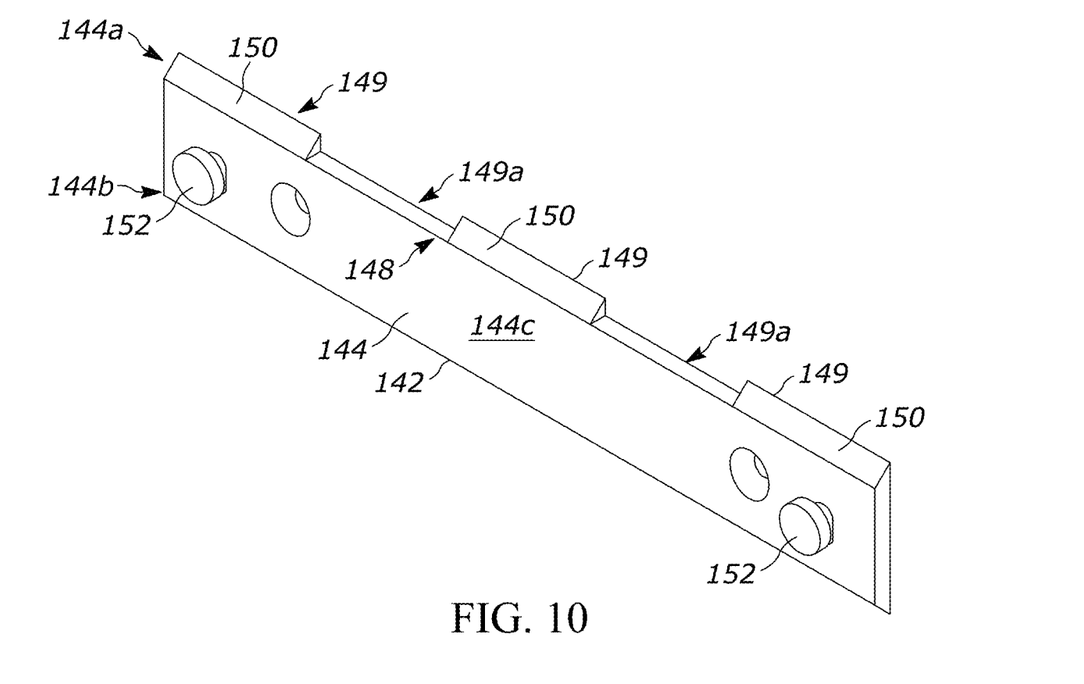
FIG. 10 is a perspective view of the first example mounting panel of the example retention bracket of FIGS. 4-6 in accordance with various examples.
Figure 11:
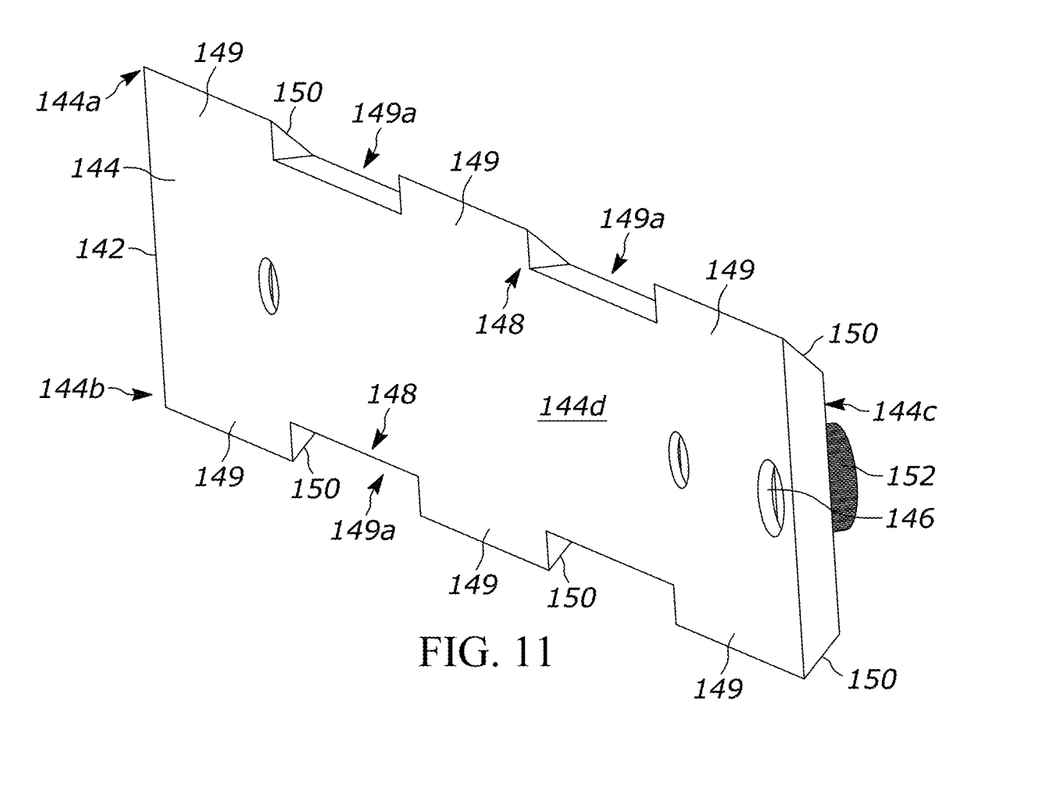
FIG. 11 is a rear perspective view of the first example mounting panel of the example retention bracket of FIGS. 4-6 in accordance with various examples.

Like the body 124 of the base panel 122, the body 144 of the mounting panel 142 may also include a sawtooth opening or profile 148. More specifically, the upper portion 144a and/or the lower portion 144b of the body 144 may include a number of abutments 149 that protrude outwardly from the respective upper and lower portions 144a, 144b. Each adjacent abutment 149 is separated by a corresponding gap 149a. In the illustrated examples, the abutments 149 are in the form of a crenellated sawtooth profile whereby a number of rectangular protrusions and gaps are formed. It is to be appreciated that any number of suitable shapes or configurations for the sawtooth profile 148 may be used whereby any number of desired abutments 149 and corresponding openings or gaps 149a are formed.

In some arrangements, any number of the abutments 149 may include a chamfered surface 150. This chamfered surface 150 may be angled relative to the device facing surface 144c. In some arrangements, an angle of approximately 45° may be formed between the chamfered surface 150 and the device facing surface 144c. Notably, and as will be discussed in further detail below, the chamfered surfaces 150 formed on the abutments 149 of the mounting panel 142 are arranged to abut the corresponding chamfered surface 130 formed on the abutments 129 of the base panel 122.

The mounting panel 142 may further include a stop member 146 in the form of an indentation or protrusion. In some examples, the stop member 146 may be formed on the base panel facing surface 144d such that it may engage with the corresponding stop member 136 formed on the base panel 122. Other examples are possible.

The mounting panel 142 may be coupled with the base panel 122 in a number of approaches. Generally, the mounting panel 142 is dimensioned to be slidably inserted into the cavity 124a of the base panel 122. The mounting panel 142 may be slidably inserted into the cavity 124a via the cavity opening 124c positioned at the side portion 124b thereof, and may be inserted into the cavity 124a until the stop member 136 engages the stop member 146 of the mounting panel 142 (and/or when the mounting panel 142 is fully inserted into the cavity 124a and contacts a sidewall of the body 124). In another approach and in environments where the mounting panel 142 may not be fully insertable into the cavity 124a via the cavity opening 124c (e.g., in environments where the enclosure 100 has components and/or dimensions that block or prevent such installation), the mounting panel 142 may be coupled with the base panel 122 by positioning each abutment 149 of the body 144 of the mounting panel 142 within a corresponding gap 129a of the abutment 129 of the body 124 of the base panel 122. In this initial arrangement, the openings 149a of the abutment 149 of the body 144 of the mounting panel 142 receive the corresponding abutment 129 of the body 124 of the base panel 122 (see, e.g., FIG. 3). The mounting panel 142 may be fully inserted into the cavity 124a of the body 124 such that the base panel facing surface 144d contacts or is otherwise positioned adjacent to the rear wall 132, and the mounting panel 142 may then be moved to the fully-coupled position. Such an arrangement requires significantly less lateral clearance (e.g., between approximately 2 cm and approximately 10 cm) than inserting the mounting panel 142 through the cavity opening 124c.

In still other implementations, the cavity 124a may be dimensioned with an appropriate tolerance to allow the mounting panel 142 to be rotatably inserted into the cavity 124a of the base panel 122. More specifically, the corresponding upper (or lower) chamfered surfaces 130, 150 may first be positioned adjacent to each other, whereupon the bottom (or upper) portion of the mounting panel 142 may be rotated into the coupled position where both the upper and lower chamfered surfaces 130, 150 abut each other. Such an arrangement requires minimal lateral clearance, as the mounting panel 142 is merely rotated or otherwise swung into place without sliding the mounting panel 142 within the cavity 124a.

In any of these approaches, the rear wall 132 of the base panel 122 abuts the base panel facing surface 144d of the mounting panel 142. Additionally, the chamfered surface 130 of each abutment 129 of the base panel 122 contacts the chamfered surface 150 of each abutment 149 of the mounting panel 142. Such engagement between the abutments 129, 149 causes the mounting panel 142 to be retained by the base panel 122, and as a result, also causes the networking component 10 to be retained by the base panel 122.

It is to be appreciated that in some arrangements, the networking component 10 may be coupled with the mounting panel 142 before the mounting panel 142 is slidably coupled with the base panel 122. In other examples, the networking component 10 may be coupled with the mounting panel 142 after the mounting panel 142 is slidably coupled with the base panel 122.

Figure 12:
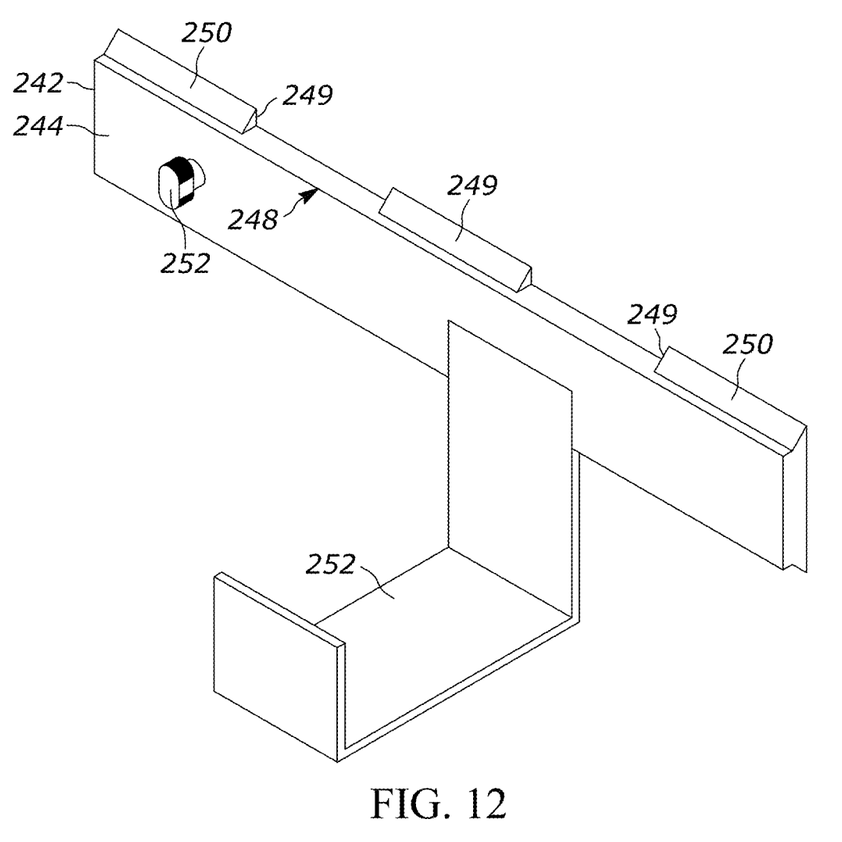
FIG. 12 is a perspective view of a second example mounting panel for use with the example retention bracket of FIGS. 4-6 in accordance with various examples.
Figure 13:
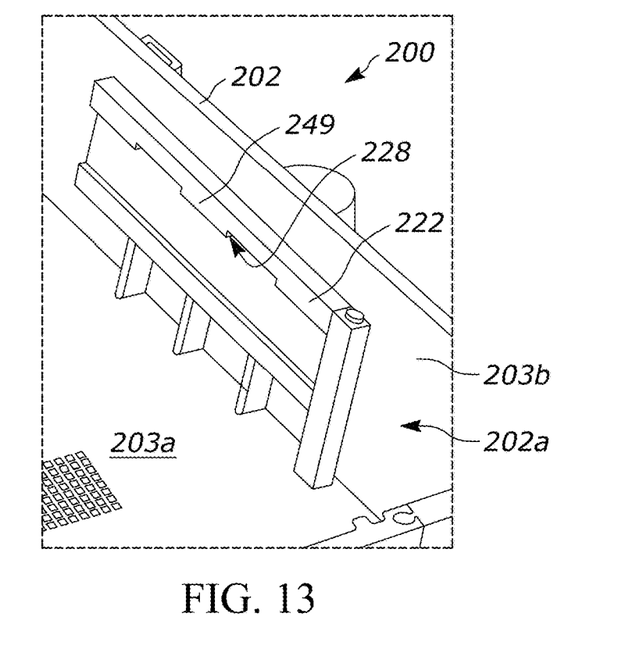
FIG. 13 is a perspective view of an example enclosure having an example base panel coupled therewith in an alternative location in accordance with various examples.
Figure 14:
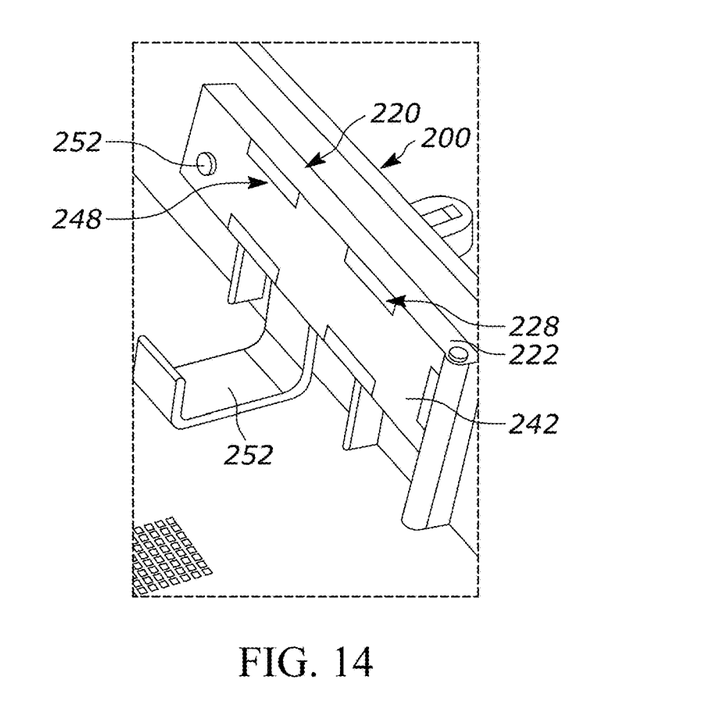
FIG. 14 is a perspective view of the example enclosure of FIG. 13 having the second example mounting panel of FIG. 12 coupled therewith in accordance with various examples.
Figure 15:
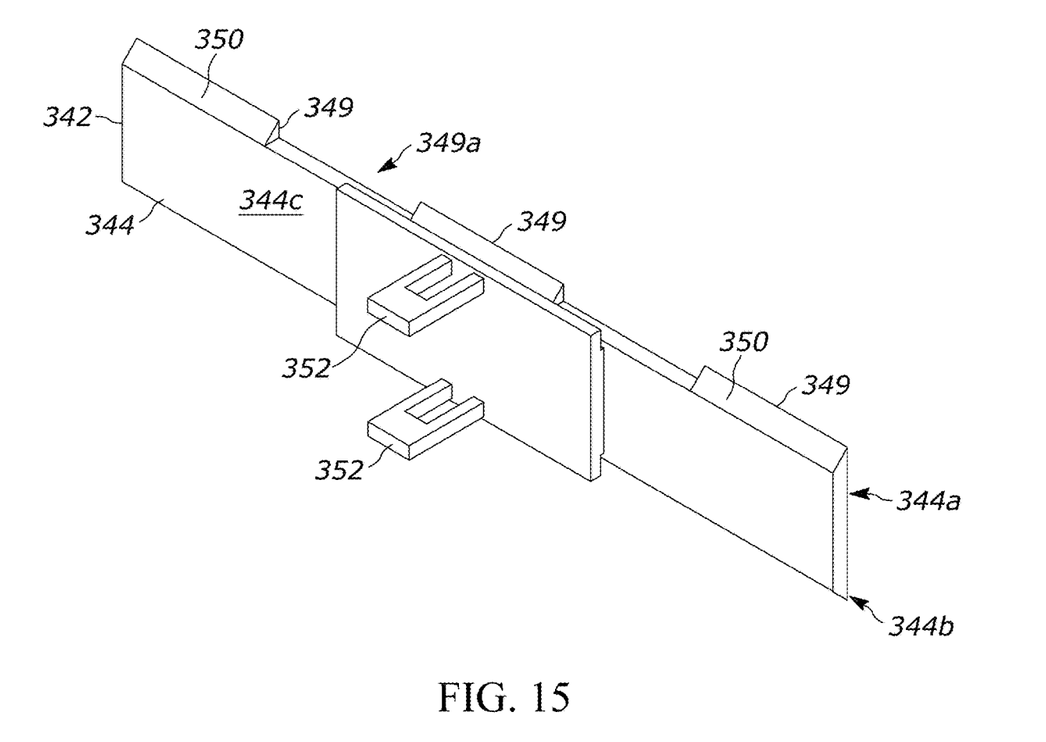
FIG. 15 is a perspective view of a third example mounting panel for use with the example retention bracket of FIGS. 4-6 in accordance with various examples.

As previously noted, the retention bracket 120 described herein may incorporate a universal base panel 122 that may receive a number of different mounting panels. In some arrangements (not illustrated), mounting panels may be used having component coupling members positioned at alternative locations to accommodate differently-dimensioned networking components. Further, with reference to FIGS. 12-15, different mounting panels may be provided having additional features specific to the components being retained. For example, FIGS. 12-14 depict an alternative enclosure 200 having a base panel 122 coupled to a sidewall 203*b* thereof. It is to be appreciated that the features of the enclosure 200 are similar to those of the enclosure 100, and as such, for the sake of brevity, these features will not be discussed in additional detail. Such similar features will have similar reference numerals as those described in the above example, but are provided in multiples of 100 (e.g., 200, 300). In a first example, the mounting panel 242 includes a component coupling member 252 in the form of an elongated arm that is dimensioned to frictionally engage a networking component (e.g., a power supply or similar component). Similarly, FIG. 15 illustrates a third example mounting panel 342 having a component coupling member 352 in the form of two arms that may frictionally engage a networking component.

So arranged, the enclosure 100 and the retention bracket 120 thereof may be used to safely retain larger networking components. As such, the retention bracket 120 may be used with existing shells 102 without needing to make modifications to the shell 102 or the networking device 10. Put differently, the retention bracket 120 may be provided as a retrofittable component.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Numerous alternative examples could be implemented, using either current technology or technology developed after the filing date of this patent, which would still fall within the scope of the claims. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

By way of example, and not limitation, the disclosure herein contemplates at least the following examples:
1. A retention bracket adapted to retain an optical network component, the retention bracket including a base panel having a body defining cavity, and a mounting panel adapted to be at least partially inserted into the cavity of the base panel. The mounting panel includes a body having an upper portion, a lower portion, and a facing surface. The facing surface has at least one component coupling member extending therefrom adapted to couple with the optical network component. The base panel and the mounting panel cooperate to receive and retain the at least one networking component.
2. The retention bracket of example 1, wherein the at least one component coupling member includes a keyhole protrusion adapted to engage a corresponding keyhole opening formed on the optical network component.

3. The retention bracket of example 1 or 2, wherein the mounting panel is adapted to be slidably inserted into the cavity from a cavity opening formed on a side portion of the base panel.
4. The retention bracket of any one of examples 1-3, wherein at least one of the upper portion or the lower portion of the mounting panel includes a sawtooth profile adapted to be received by a corresponding sawtooth opening formed in the cavity of the base panel.
5. The retention bracket of example 4, wherein the sawtooth profile comprises a crenellated sawtooth profile.
6. The retention bracket of any one of examples 1-5, wherein at least one of the upper portion or the lower portion of the mounting panel further includes a chamfered surface adapted to slidably engage with the body of the base panel.
7. The retention bracket of example 6, wherein the body of the base panel further includes a chamfered surface adapted to slidably engage the chamfered surface of the mounting panel.
8. The retention bracket of any one of examples 1-7, wherein the base panel includes a stop member adapted to engage the mounting panel to limit lateral movement thereof.
9. The retention bracket of any one of examples 1-8, wherein the body of the mounting panel includes at least one through hole adapted to receive a fastener to couple the mounting panel with a structure.
10. An enclosure adapted to receive at least one optical networking component, the enclosure comprising a shell defining an interior volume and a retention bracket adapted to be received within the interior volume of the shell. The retention bracket includes a base panel having a body defining cavity, and a mounting panel adapted to be at least partially inserted into the cavity of the base panel. The mounting panel includes a body having an upper portion, a lower portion, and a facing surface having at least one component coupling member extending therefrom adapted to couple with the optical network component. wherein the base panel, and the mounting panel cooperate to receive and retain the at least one networking component within the shell.
11. The enclosure of example 10, wherein the shell includes a cavity adapted to at least partially receive a portion of the body of the base panel.
12. The enclosure of example 10 or 11, wherein the base panel is integrally formed with the shell.
13. The enclosure of any one of examples 10-12, wherein the at least one component coupling member includes a keyhole protrusion adapted to engage a corresponding keyhole opening formed on the optical network component.
14. The enclosure of any one of examples 10-13, wherein the mounting panel is adapted to be slidably inserted into the cavity from a cavity opening formed on a side portion of the base panel.
15. The enclosure of any one of examples 10-14, wherein at least one of the upper portion or the lower portion of the mounting panel includes a sawtooth profile adapted to be received by a corresponding sawtooth opening formed in the cavity of the base panel.
16. The enclosure of example 15, wherein the sawtooth profile comprises a crenellated sawtooth profile.
17. The enclosure of any one of examples 10-16, wherein at least one of the upper portion or the lower portion of the mounting panel further includes a chamfered surface adapted to slidably engage with the body of the base panel.
18. The enclosure of example 17, wherein the body of the base panel further includes a chamfered surface adapted to slidably engage the chamfered surface of the mounting panel.
19. The enclosure of any one of examples 10-18, wherein the base panel includes a stop member adapted to engage the mounting panel to limit lateral movement thereof.
20. The of any one of examples 10-19, wherein the body of the mounting panel includes at least one through hole adapted to receive a fastener to couple the mounting panel with a structure Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. A retention bracket adapted to retain an optical network component, the retention bracket including:
 a base panel having a body defining a cavity, the body including at least one abutment extending inwardly into the cavity and defining a sawtooth profile, the at least one abutment having an inner chamfered surface; and
 a mounting panel adapted to be at least partially inserted into the cavity of the base panel, the mounting panel including a body having an upper portion, a lower portion, and a facing surface, the facing surface having at least one component coupling member extending therefrom adapted to couple with the optical network component, at least one of the upper portion or the lower portion including at least one abutment defining a sawtooth profile, the at least one abutment having a chamfered surface angled relative to the facing surface;
 wherein the base panel and the mounting panel cooperate to receive and retain the optical network component via sliding engagement between the at least one abutment of the base panel and the at least one abutment of the mounting panel.
2. The retention bracket of claim 1, wherein the at least one component coupling member includes a keyhole protrusion adapted to engage a corresponding keyhole opening formed on the optical network component.

3. The retention bracket of claim 1, wherein the mounting panel is adapted to be slidably inserted into the cavity from a cavity opening formed on a side portion of the base panel.

4. The retention bracket of claim 1, wherein the sawtooth profile comprises a crenellated sawtooth profile.

5. The retention bracket of claim 1, wherein the base panel includes a stop member adapted to engage the mounting panel to limit lateral movement thereof.

6. The retention bracket of claim 1, wherein the body of the mounting panel includes at least one through hole adapted to receive a fastener to couple the mounting panel with a structure.

7. An enclosure adapted to receive at least one optical network component, the enclosure comprising:
   a shell defining an interior volume; and
   a retention bracket adapted to be received within the interior volume of the shell, the retention bracket including:
      a base panel having a body defining a cavity, the body including at least one abutment extending inwardly into the cavity and defining a sawtooth profile, the at least one abutment having an inner chamfered surface; and
      a mounting panel adapted to be at least partially inserted into the cavity of the base panel, the mounting panel including a body having an upper portion, a lower portion, and a facing surface, the facing surface having at least one component coupling member extending therefrom adapted to couple with the optical network component, at least one of the upper portion or the lower portion including at least one abutment defining a sawtooth profile, the at least one abutment having a chamfered surface angled relative to the facing surface;
      wherein the base panel, and the mounting panel cooperate to receive and retain the optical network component within the shell via sliding engagement between the at least one abutment of the base panel and the at least one abutment of the mounting panel.

8. The enclosure of claim 7, wherein the shell includes a cavity adapted to at least partially receive a portion of the body of the base panel.

9. The enclosure of claim 7, wherein the base panel is integrally formed with the shell.

10. The enclosure of claim 7, wherein the at least one component coupling member includes a keyhole protrusion adapted to engage a corresponding keyhole opening formed on the optical network component.

11. The enclosure of claim 7, wherein the mounting panel is adapted to be slidably inserted into the cavity from a cavity opening formed on a side portion of the base panel.

12. The enclosure of claim 7, wherein the sawtooth profile comprises a crenellated sawtooth profile.

13. The enclosure of claim 7, wherein the base panel includes a stop member adapted to engage the mounting panel to limit lateral movement thereof.

14. The enclosure of claim 7, wherein the body of the mounting panel includes at least one through hole adapted to receive a fastener to couple the mounting panel with a structure.

* * * * *